Aug. 13, 1935.  O. P. LUETSCHER  2,011,554
OPEN HEARTH FURNACE
Filed July 15, 1933  3 Sheets-Sheet 1
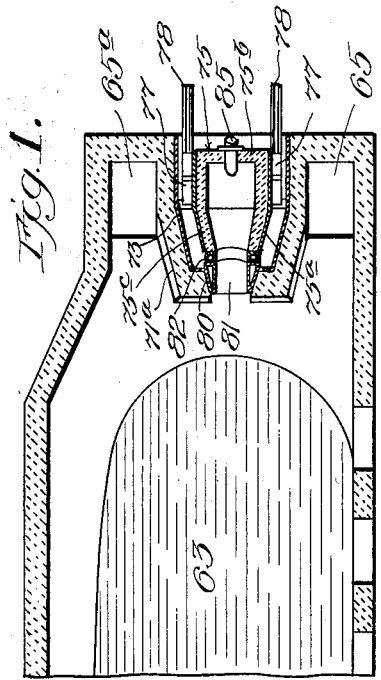
Fig.1.
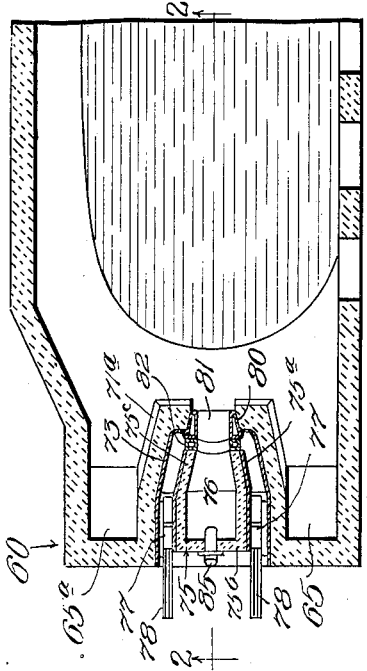
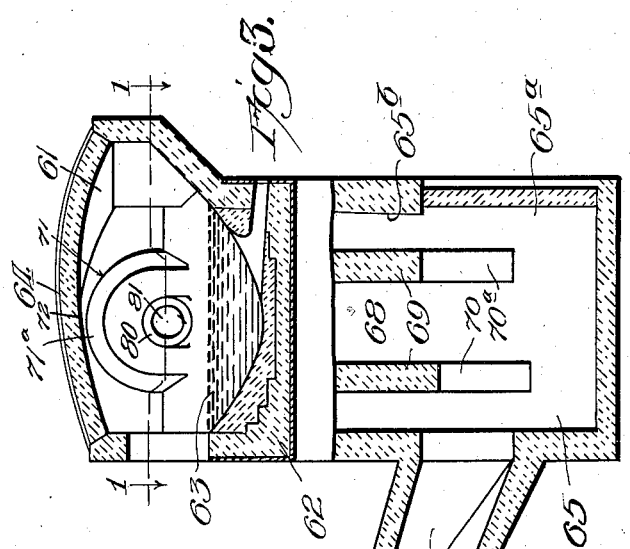
Fig.3.
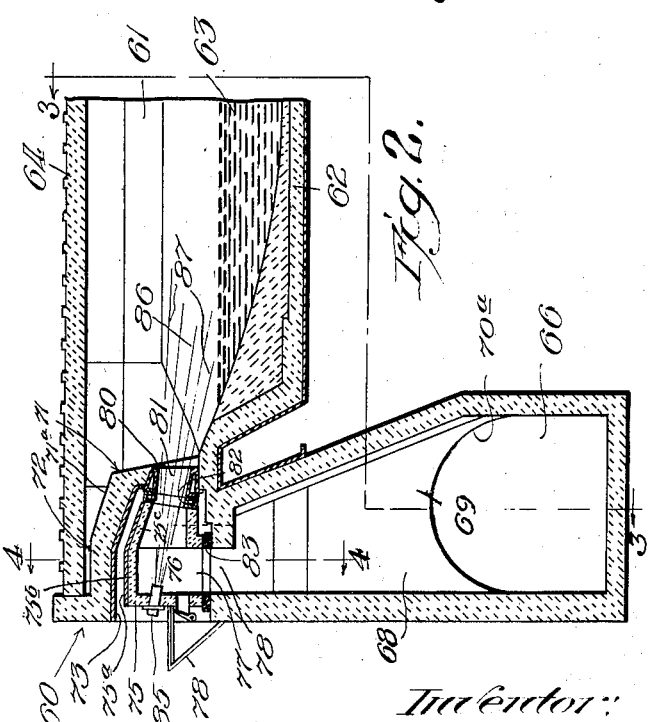
Fig.2.
Inventor:
Oliver P. Luetscher
by Rector, Hibben, Davis & Macauley
Attys.

Aug. 13, 1935.　　　O. P. LUETSCHER　　　2,011,554
OPEN HEARTH FURNACE
Filed July 15, 1933　　　3 Sheets-Sheet 2
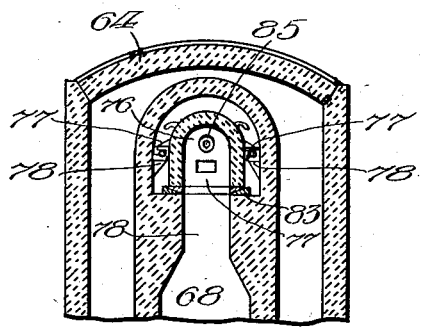
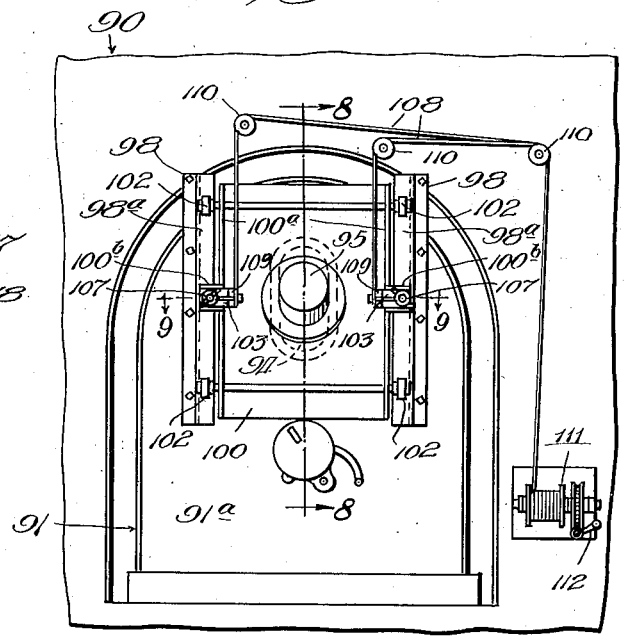
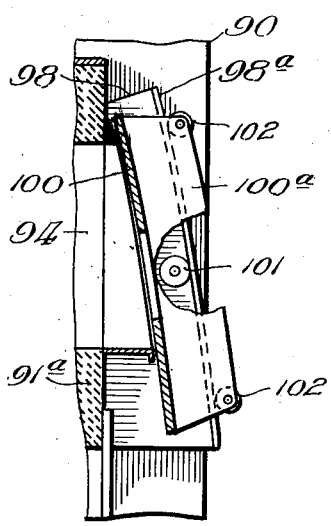
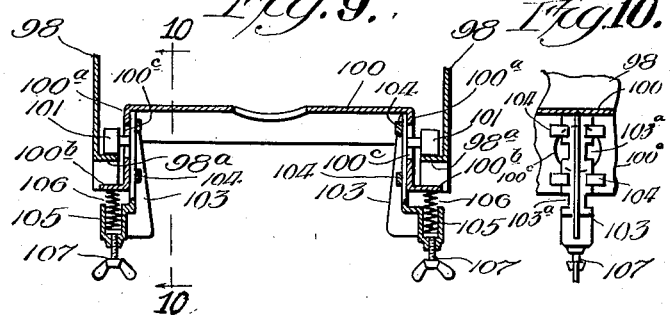
Inventor:
Oliver P. Luetscher
by Rector, Hibben, Davis & Macauley,
Attys.

Aug. 13, 1935.  O. P. LUETSCHER  2,011,554
OPEN HEARTH FURNACE
Filed July 15, 1933   3 Sheets-Sheet 3

Inventor:
Oliver P. Luetscher.
by Rector, Hibben, Davis & Macauley
Attys.

Patented Aug. 13, 1935

2,011,554

UNITED STATES PATENT OFFICE 2,011,554

OPEN HEARTH FURNACE

Oliver P. Luetscher, Peru, Ill.

Application July 15, 1933, Serial No. 680,591

13 Claims. (Cl. 263—15)

This invention relates to improvements in open hearth furnaces and, although particularly adapted for furnaces of the type to be used with liquid fuels, it is equally applicable to furnaces employing gaseous fuels, especially high heat value gases, such as natural gas or by-product gas, either alone or in combination with each other. The principal object of the invention is to provide a relatively simple and effective form of construction adapted to secure extremely high flame temperatures by the complete mixing of the fuel and combustion air, low velocity of flame impingement on the bath, together with control of the direction of the flame of hot gases to avoid the damage to the refractories which has heretofore accompanied attempts to secure the advantages of extremely hot flames and high rates of fuel input. The present invention is particularly adapted for application to open hearth furnaces of the regenerative type in which the hot gases of combustion, when discharged in one direction, heat the passages of a regenerative chamber through which the combustion air subsequently passes and is heated on its way to the furnace chamber when the direction of discharge of the gases of combustion is reversed.

In open hearth furnaces of the type heretofore used, differences in pressure of the incoming combustion air in different parts of the furnace have caused the air currents to assume a whirling or eddy-like motion over the molten bath, with the result that the air currents have tended to pick up hot gases and slag spray from the flame and the bath surface and cause them to impinge on the roof of the furnace with consequent damage and necessity for frequent repair. Efforts to overcome this difficulty by building port blocks and so-called "monkey" walls to control the direction of the air currents and to minimize the whirling action have not met with a high degree of success, particularly when embodied in a furnace of the regenerative type, inasmuch as the blocks or division walls provided for controlling the air currents form an obstruction which produces eddies in the outgoing gases at one end of the furnace chamber with consequent erosion of the refractory walls of the passages through which gas and air alternately pass. Efforts have also been made to overcome the difficulties by extending the refractory structure over the burners and locating the burners nearer the metal bath but this has caused too violent impingement of the flame upon the bath and results in an incomplete utilization of the combustion space in addition to causing deterioration of the refractories by reason of the excessive temperatures at points where the gases impinge thereon. In addition, the imperfectly developed flame which is produced by this arrangement causes only a relatively low temperature to be obtained with a consequent slow melting of the metal.

In the present invention, the foregoing disadvantages are effectively overcome, the mixing of the fuel and air is much more thoroughly accomplished than has been possible with any of the previous types of open hearth furnaces in common use, the spiral action of the currents is avoided, the formation of destructive eddy currents is effectively prevented and the velocity of impingement of the flames on the bath is relatively low. These advantageous features of the present invention make it possible to operate a furnace with a very high rate of production with a minimum of refractory cost, with low fuel consumption, and with a minimum of loss and annoyance by reason of shut-downs for repair purposes. A further feature of the present invention is the provision of an improved construction whereby the concentration of the air flow about the flame at the incoming end of the furnace and the free outflow of the waste gases from the other end of the furnace is accomplished without the use of dampers or other mechanical apparatus. A further object of the invention is to provide a construction in which provision is made for a relatively large latitude of adjustment of the angle of impingement of the flame on the bath, without the use of an excessively large port for the flame. Still another object of the invention is to provide improved means for housing and protecting the burner and for permitting movement of the burner housing bodily toward and from the bath to allow access for replacement and repair. Another important object is to provide means for adjusting the angle of the burner with respect to the surface of the bath. Other objects and advantages of the invention will be pointed out in connection with the features of construction hereinafter described.

The nature of the invention will be understood from the following specification taken with the accompanying drawings, in which—

Fig. 1 is a horizontal section taken through the principal part of a furnace embodying the improvements of the present invention, the section being taken on the line 1—1 of Fig. 3;

Fig. 2 shows a vertical section taken on the line 2—2 of Fig. 1:

Fig. 3 shows a vertical section taken on the line 3—3 of Fig. 2;

Fig. 4 is a vertical section taken on the line 4—4 of Fig. 2;

Fig. 7 is an elevation of the end of the furnace embodying the burner mounting illustrated in Fig. 2, showing the carriage for the burner;

Fig. 8 shows an enlarged vertical section on the line 8—8 of Fig. 7, omitting the burner;

Fig. 9 shows a horizontal section taken on the line 9—9 of Fig. 7, omitting the burner; and Fig. 10 shows a section taken on the line 10—10 of Fig. 9.

Figure 5:
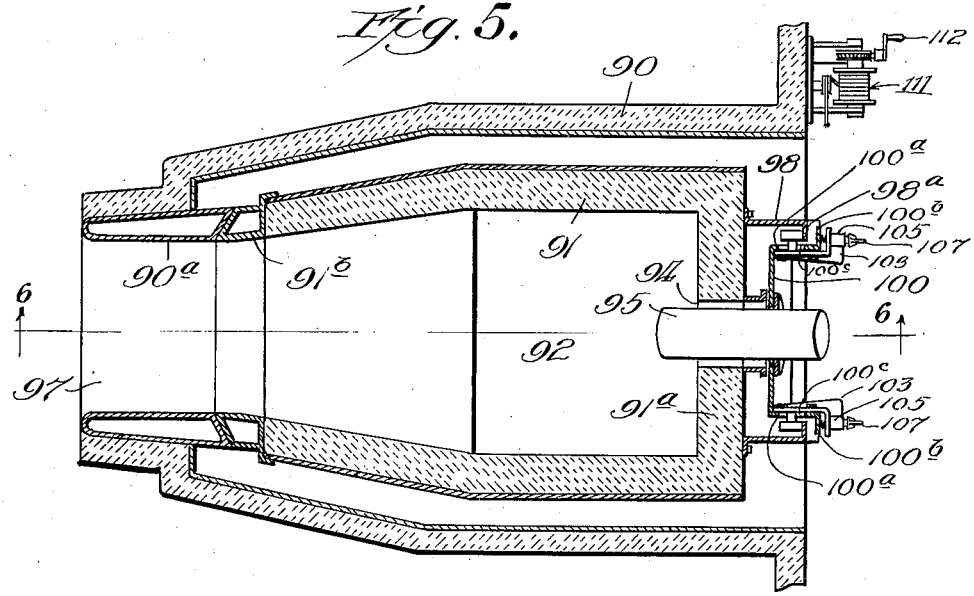
Fig. 5 is a section similar to a portion of that of Fig. 1, showing a modified form of the invention in which the burner is mounted for angular adjustment.

The disadvantages in open hearth practice, to which reference has been made are overcome in the present invention, a preferred embodiment of which is illustrated in the accompanying drawings. This improved construction comprises a furnace 60 having a furnace chamber 61 located above the hearth 62 which contains the molten metal bath 63. The furnace chamber is covered by a refractory roof 64 and this chamber communicates at its ends with the up-take passages 65 and 65ª which extend upwardly from the slag pockets 66 to which heated air for combustion is supplied through the fantail passages 67 leading from the regenerative chambers. The up-take passages 65 and 65ª extend upwardly on opposite sides of the slag pockets and each pair of up-take passages is separated from an intervening up-take passage 68 by means of the refractory division walls 69 which are supported at their lower ends by arches 70 and 70ª extending over the slag pocket 66 and united with the side walls of the chamber. One arch 70ª is made higher than the other arch 70, in order to compensate for the natural tendency of the incoming air to produce different air pressures at the lower ends of the up-take passages. One wall of the passage 65ª may be inclined as shown at 65ᵇ in order to make that passage smaller at the lower end while permitting it to have the same cross-sectional area at the top as the passage 65, which further tends to equalize the effect of the unequal pressures at opposite sides of the slag pocket. The division walls 69 are connected at their upper ends by the arch-shaped housing or dog house 71 which extends a considerable distance into the furnace chamber 61 with the upper portion thereof spaced slightly from the roof 64 as shown at 72. The inner end of the dog house 71 is tapered inwardly on its upper and lateral sides, as shown at 71ª, Figs. 1 and 2, and its length and position adjacent the roof serve the purpose of preventing the air currents rising through the up-take passages 65 and 65ª from assuming an objectionable spiral motion in the furnace chamber.

The housing or dog house 71 is provided with a metal lining 73 and the chamber within this housing is partially occupied by an inner casing or dog house 75 which is movable with respect to the stationary dog house 71. The casing 75 is made up of a metallic outer wall 75ª having a lining of refractory material 75ᵇ and the inner chamber 76 thereof communicates through a port 77 in the lower wall of the casing with a port 78 which is formed at the upper end of the central uptake passage 68 through which air is supplied for combustion of the fuel within the casing 75. The casing 75 is provided at its sides with brackets 77 and the metallic lining 73 of the dog house 71 is provided with supporting brackets 78 which project outwardly from the open outer end of the dog house, as shown in Figs. 1 and 2. The brackets 77 and 78 are preferably provided with longitudinal grooves adapted to receive balls on which the casing 75 may be moved outwardly from the normal inner position shown in the drawings. The inner end of each dog house 71 is provided with an opening in which is mounted a hollow water-cooled ring 80, having a suitable connection with a water circulating system and provided with a central circular opening 81 which constitutes the burner port. The inwardly projecting conical portion 75ᶜ of the casing 75 is also provided with a hollow water-cooled ring 82 which seats against the ring 80 and forms a tight connection therewith when the casing 75 is in its inner position, at which time the casing 75 also forms a fluid-tight connection with the walls of the up-take passages 68 through refractory wedges 83, Fig. 2 which are inserted between the walls and the lower edge of the casing 75 around the port 77. In the rear wall of the casing 75, there is stationarily mounted a burner 85 which is located with its longitudinal axis in alignment with the axis of the port 81 and which may be of the usual type employed with open hearth regenerative furnaces. Instead of employing oil as a fuel, the burner may be replaced by a nozzle through which natural gas or by-product gas may be injected at sufficient velocity to entrain a supply of air from the passage 68 as combustion takes place. If desired, various fuels may be used in combination. By mounting the burner casing 75 for movement on the tracks, it may be withdrawn to permit ready access to the water-cooled rings 80 and 82 for purposes of cleaning, replacement or repair.

By means of the construction described above, the present invention accomplishes the separation of the space at each end of the furnace chamber 61 into two separate chambers or air passages located on opposite sides of the dog house 71 with only a restricted opening above the dog house, thus effectually preventing any substantial spiral action of the air currents entering the furnace chamber, even when there is a considerable unbalance in the pressure of the air in the up-take passages 65 and 65ª. This unbalance of the air pressure is, however, effectually overcome by so proportioning the arches 70 and 70ª and the passages 65 and 65ª as to offset any tendency for the development of different air pressures under the influence of the current of air entering the slag pocket 66 through the fantail passage 67. The exact positions of the arches 70 and 70ª and of the division walls 69 may be determined in the field or by the use of small scale models, thereby obtaining such proportions of the parts as will lead to the least possible unbalance of the air currents in the different passages. The flame projected from the mouth of the burner 85 serves to entrain a quantity of air drawn upwardly through the passage 68 and there is a very thorough mixing of this air with the burning jet of fuel within the movable casing or dog house 75. The development of the flame takes place in the chamber 76 of this casing, where it is completely surrounded by air, instead of taking place in the trough formed between the port blocks, as in furnaces of the type heretofore used, and thus there is no possibility of the direction of the flame being disturbed by whirling currents of air. With this construction, the nozzle of the burner may be located much farther from the molten bath 63 than is possible in the usual types of furnaces with the result that the velocity of impingement of the flame on the surface of the bath is greatly reduced. A further advantage is that the burner may be mounted with its axis coincident with the axis of the port 81, thus avoiding displacement of the flame in a manner which would cause spiral movement of the flame by reason of its engagement with the wall of the port. The fuel may be ejected from the orifice of the burner by means of a jet of steam or compressed air and the burner is set with its axis on the center line 86 of the port 81 with its mouth located at such a distance from the port 81 as to cause the cone of flame, indicated by the lines 87, to fill the outer end of the passage forming this port, at the point where the flame enters the furnace chamber see Fig. 2. In addition to the advantages which are gained at the end of the furnace chamber into which air flows through the uptake passages 65 and 65ª, there is an advantage gained at the opposite end of the furnace in that the outflow of hot gases is unobstructed by excessively high port blocks or walls as in the prior art structures heretofore referred to. This prevents the formation of eddy currents in the passages 65 and 65ª through which the hot gases are discharged and the length of life of the refractories in this part of the construction is materially increased. There is a further advantage in that, at the discharge end of the furnace chamber, only a small portion of the hot gases flows through the passage 68, because of the small dimension of the port 81, so that the walls 69 are not subjected to extreme heat on both sides and consequently have a longer life.

Figure 6:
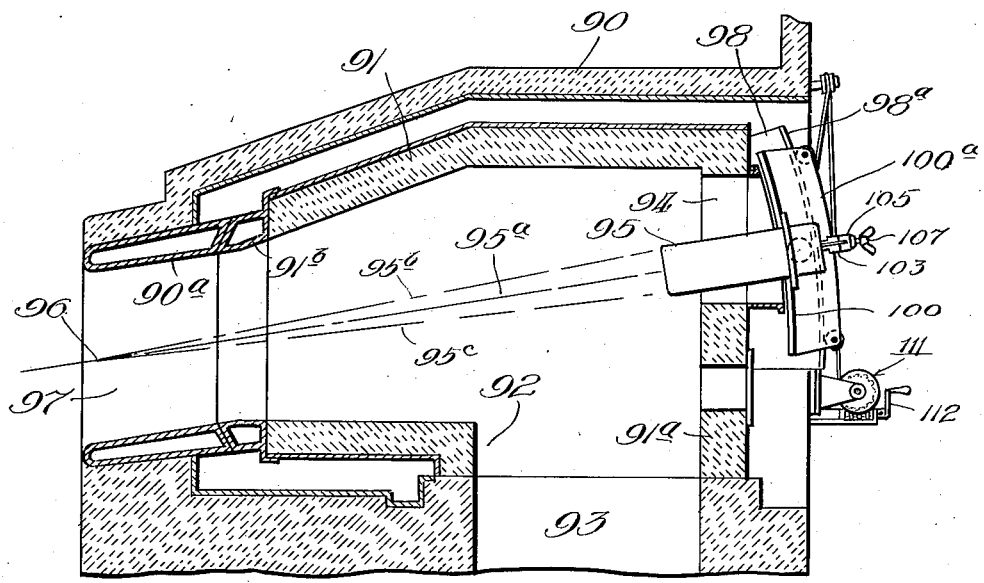
Fig. 6 is a vertical section taken on the line 6—6 of Fig. 5.

In the foregoing description, the burner 85 has been described as being rigidly mounted in the movable casing or dog house 75 and this arrangement has the advantage of simplicity while at the same time eliminating the possibility of inequalities of adjustment by different operators. In some cases it may be desirable to adjust the angle at which the flame from the burner strikes the bath of molten metal, without at the same time having the cone of the flame deflected from its central position within the burner port, and a construction by which these results may be obtained is illustrated in Figs. 5 to 10, inclusive, in which there is illustrated a construction substantially identical with that heretofore described in connection with Figs. 1 to 4, inclusive, except that the burner is adjustably mounted. In this construction, a stationary dog house 90 has mounted within it an inner casing or dog house 91 which is substantially similar to the casing 75 previously described and which has in the lower wall thereof a port 92 communicating with the upper end of the uptake passage 93 through which air for primary combustion is drawn through the slag pocket at the lower end of the passage. The inner end of the casing 91 carries a water cooled ring 91ᵇ which is adapted to fit against the water-cooled ring 90ª on the dog house 90, as in the construction previously described. The rear wall 91ª of the casing 91 is provided with an opening 94 in which the burner 95 is located. This burner is positioned so that its axis 95ª passes through a point 96 located centrally within the mouth or port 97 of the casing 91 and in order that the burner may be swung about the point 96 as an axis or pivot, in order to change the angle of incidence of the flame upon the surface of the molten bath, means are provided for adjusting the burner 95 within the opening 94. This is accomplished by providing a pair of upwardly extending track members 98 on opposite sides of the rear end of the burner 95 and mounting the burner for movement along the curved inwardly extending flanges 98ª of these track members. The burner 95 is mounted on a carriage 100 which comprises a transverse plate having rearwardly extending flanges 100ª terminating in outwardly directed flanges 100ᵇ which extend substantially parallel to the curved flanges 98ª of the track members. Each outwardly extending flange 100ª of the carriage is provided with a roller 101 to travel on the inner surface of the adjacent flange 98ª and these flanges 100ª of the carriage are also provided with other rollers 102 which are adapted to engage the outer surfaces of the flanges 98ª, thus guiding the carriage 100 in a curved path having the center of curvature at the point 96. In order to cause the burner carriage to be held against the flanges 98ª, the trunnions of the rollers 101 are mounted on brackets 103, see Fig. 9, which are slidably mounted behind the lugs 104 which are welded onto the side flanges 100ª of the carriage, as shown in Fig. 10. Each bracket 103 has spaced sets of oppositely disposed notches 103ª adapted to register with the spaced sets of lugs 104 and each flange 100ª of the carriage has an aperture 100ᶜ adapted to permit a roller 101 to pass therethrough thus allowing the rollers 101 and their brackets 103 to be assembled on the carriage 100 by inserting the rollers through the apertures and passing the lugs 104 through the notches 103ª after which the bracket 103 may be moved longitudinally to cause the lugs to overlap its edges. Each bracket 103 carries at its outer end a socket 105 in which is mounted a coil spring 106 bearing at its inner end against the adjacent flange 100ᵇ of the carriage. Each spring 106 is adapted to be compressed by a thumb screw 107 threadedly engaging the outer end of the socket member, thus causing the spring to exert a resilient pressure on the adjacent flange 100ᵇ and causing a corresponding resilient pressure of the connected roller 101 upon the flange 98ª of the coacting track member. The adjustment of the burner carriage on the track members may be effected by cables 108 which are connected to blocks 109 carried by the flanges 100ª of the carriage and which are passed over rollers 110 mounted on the end wall of the furnace. The other ends of these cables are wound on the drum of a winch 111 which may be operated by a handle 112 to wind up the cables and thus elevate the burner carriage. Upon releasing the winch, the burner may be lowered by gravity to the desired point. With this arrangement, the burner 95 may be swung so as to cause the axis of the flame to occupy either of the positions illustrated by the dotted lines 95ᵇ or 95ᶜ, Fig. 6, or any intermediate position, for example, without causing the axis of the flame to be displaced from the central point 96 within the mouth of the burner casing. In this way, the angle of incidence of the flame upon the molten bath may be changed without setting up any spiral action of the flame due to the engagement thereof with the wall of the casing 91.

The arrangement of the hearth, slag pockets, uptakes, division walls, burner housings, burners, air passages and burner ports in the present invention is such that the flame projected from the burners acts as an inducing jet, drawing a relatively large portion of the air required for combustion into the burner housing and its entrainment in the flame before entering the furnace chamber through the burner port, while at the same time the formation of spiral or whirling currents in the furnace chamber is prevented and substantially free openings are maintained for the exit of waste gases from the furnace chamber. In the practice of the improved method of the present invention, the burner is located in an air passage opposite to the burner port and spaced at such a distance therefrom that the flame which is projected from the burner at high velocity through the port operates to draw in air from the air passage sufficient to supply the major portion of the air required for combustion, while the additional air needed for combustion is supplied from the uptake passages located on opposite sides of the burner passage and an upflow of air is consistently maintained in these uptake passages, thereby assisting in overcoming any tendency for the formation of eddy currents in the furnace chamber.

Although certain forms of the invention have been shown and described by way of illustration, it will be understood that it may be constructed in various other embodiments coming within the scope of the appended claims.

I claim:

1. In an open hearth regenerative furnace, a pair of uptake passages communicating with one end of the furnace chamber, a slag pocket having communication with the lower ends of said passages, means forming communication between a regenerative chamber and said slag pocket, an auxiliary air passage leading upwardly from said slag pocket between said uptake passages, and division walls between said auxiliary passage and said uptake passages, said division wall further removed from the regenerative chamber being of lesser depth than the other division wall.

2. In an open hearth furnace, uptake passages communicating with the furnace chamber, a housing within said chamber mounted between said passages and in transverse alignment therewith and having a port communicating with said chamber at a point in advance of said uptakes, a casing mounted in said housing and having a mouth in registry with said port, and a burner mounted in said casing in alignment with said port.

3. In an open hearth furnace, uptake passages communicating with one end of the furnace chamber, a stationary housing located within said chamber between and in transverse alignment with said uptakes and having a port communicating with said chamber in advance of said uptakes, a casing mounted in said housing and having a mouth located in registry with said port, a burner carried by said casing in axial alignment with said port, and an auxiliary air uptake extending upwardly between said uptake passages, said casing having an opening communicating with said auxiliary air uptake.

4. In an open hearth furnace, uptake passages communicating with one end of the furnace chamber, a stationary housing located within said chamber between and in transvere alignment with said passages and having a port communicating with said chamber in advance of said uptakes, a casing mounted in said housing and having a mouth located in registry with said port, a burner carried by said casing in axial alignment with said port, an auxiliary air uptake extending upwardly between said uptake passages, said casing having an opening communicating with said auxiliary air uptake, and means supporting said casing for movement thereof toward and from said port within said housing.

5. In an open hearth furnace, uptake passages communicating with the furnace chamber, a stationary housing within said chamber located between said passages and in transverse alignment therewith in proximity to the roof of said chamber and having a port at its inner end at a point in advance of said uptakes communicating with said chamber, a burner mounted in said housing at a substantial distance to the rear of said port and adapted to project a flame through said port, and means for changing the angular position of said burner without changing the position of said flame within said port.

6. In an open hearth furnace, a stationary housing located at one end of the furnace chamber and having a port located at its inner end with its axis inclined downwardly and inwardly toward the surface of the bath of metal in said chamber, a burner mounted within said housing at a point removed from said port, and means for adjusting the angle of said burner to change the angle of incidence of the flame upon said bath while maintaining said flame in an axial position within said port.

7. In an open hearth furnace, a stationary housing located at one end of the furnace chamber and having a port at its inner end, a casing mounted within said housing and having a mouth registering with said port, a burner carried by said casing for projecting a flame through said port with the axis of the flame coincident with the center of said port, and means for adjusting said burner in said casing to change the angle of incidence of said flame within said furnace chamber while maintaining the axial position of said flame within said port.

8. In an open hearth furnace, a housing mounted at one end of the furnace chamber and having a port in its inner end, a casing mounted within said housing and having a mouth registering with said port, means for supplying air to the interior of said casing, a burner carriage mounted at the outer end of said casing, a burner carried by said carriage, and means for adjusting said carriage circumferentially about a point located centrally within said port for changing the angle of incidence of the flame on the bath while maintaining the position of the flame within said port.

9. In an open hearth furnace, uptake passages communicating with one end of the furnace chamber, a housing within said chamber located between and in transverse alignment with said uptakes and having a port communicating with said chamber at a point in advance of said uptakes, a water-cooled hollow ring surrounding said port, a burner casing mounted in said housing and having a mouth adapted to register with said port, and a water-cooled ring mounted around said mouth, said burner casing being removable from said housing to permit access to said water-cooled rings.

10. In an open hearth furnace, a furnace chamber, a housing located within one end of said furnace chamber having a port at its inner end, up-take passages communicating with said chamber at opposite sides of said housing, a burner located in said housing and displaced rearwardly from said port, an auxiliary air up-take extending upwardly between said up-takes for supplying air to said burner rearwardly of said port, the flame projected by said burner being adapted to fill said port without materially engaging the walls of said port, and means for changing the position of said burner circumferentially about a point centrally located within said port for changing the angle of incidence of the flame on the bath while maintaining the position of the flame within said port.

11. In an open hearth furnace, uptake passages communicating with the furnace chamber, a housing within said chamber located between said passages and in transverse alignment therewith in proximity to the roof of said chamber and having a port at its inner end at a point in advance of said uptakes communicating with said chamber, means for introducing fuel to said port, said fuel introducing means being so arranged as to permit changing the angle of impingement of the flame on the bath while maintaining said flame in an axial position within said port.

12. In an open hearth furnace, a housing located at one end of the furnace chamber and having a port located at its inner end with its axis inclined downwardly and inwardly toward the surface of the bath in said chamber, means for introducing fuel to said port, said fuel introducing means being so arranged as to permit changing the angle of impingement of the flame on the bath while maintaining said flame in an axial position within said port.

13. The method of operating an open hearth furnace which consists in introducing air to the furnace chamber through a plurality of air uptakes in unrestricted flow and directing the ingress of air into the chamber so as to cause it to flow in two substantially separate streams horizontally and inwardly from one end of the furnace at opposite sides thereof, and also through a central stream at a higher velocity than the two outside streams and inclined downwardly on to the surface of the bath, the effect of which is to draw the said outside streams of air inwardly and downwardly on to the bath, and introducing fuel into said central air stream, whereby the formation of eddy currents is prevented and the position of the flame within the furnace chamber is maintained at a substantially fixed axial position at all times.

OLIVER P. LUETSCHER.